Figure 1:
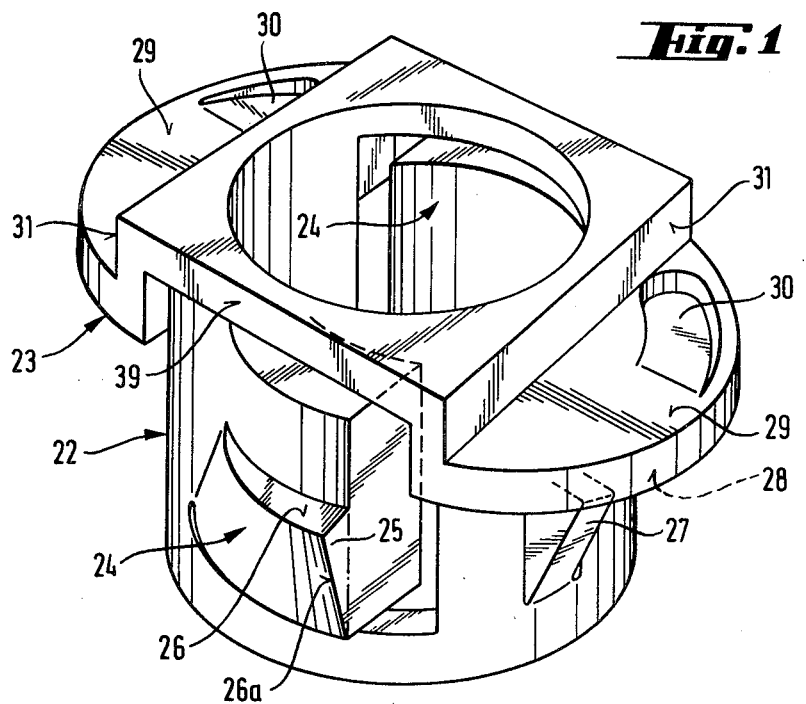

United States Patent [19]

Simon

[11] Patent Number: 4,474,489

[45] Date of Patent: Oct. 2, 1984

[54] TENSION-RELIEVING CABLE DUCT

[76] Inventor: Hans Simon, Bruchhausener St., D-5463 Unkel-on-Rhine, Fed. Rep. of Germany

[21] Appl. No.: 478,853

[22] Filed: Mar. 25, 1983

[30] Foreign Application Priority Data

Mar. 29, 1982 [DE] Fed. Rep. of Germany ....... 3211511

[51] Int. Cl.³ .............................................. F16L 5/00
[52] U.S. Cl. .................................... 403/195; 248/56;
174/65 G; 174/153 G; 285/162; 403/194;
403/238; 403/348; 403/197; 24/590
[58] Field of Search ............... 403/195, 197, 194, 238,
403/239, 348; 285/209, 210, 208, 162; 220/237,
238; 24/221 R; 248/56, 27.3, 27.1; 174/65 G,
153 G, 152 G

[56] References Cited

U.S. PATENT DOCUMENTS

| | | | |
|---|---|---|---|
| 2,873,131 | 2/1959 | Metrailer | 403/348 |
| 3,236,545 | 2/1966 | Parkes et al. | 285/215 |
| 4,133,560 | 1/1979 | Ishikawa et al. | 285/209 X |
| 4,169,572 | 10/1979 | Simon | 248/56 |
| 4,216,930 | 8/1980 | Rossler, Jr. et al. | 174/153 G X |
| 4,299,363 | 11/1981 | Datschefski | 248/56 |
| 4,354,651 | 10/1982 | Simon | 248/56 |
| 4,432,520 | 2/1984 | Simon | 174/153 G |
| 4,436,265 | 3/1984 | Simon | 174/153 G |

FOREIGN PATENT DOCUMENTS 2556878  6/1977  Fed. Rep. of Germany .

Primary Examiner—Cornelius J. Husar
Assistant Examiner—Joseph A. Fischetti

[57] ABSTRACT

This invention relates to a tension-relieving cable duct consisting of tough, hard plastic material and comprising a substantially platelike head portion (a head plate) and a hollow shank, which is integrally molded with the head plate, and gripping jaws, which in response to an angular movement of about 90 degrees cooperate with a non-circular through opening, which is formed in a wall of an appliance and contains the duct.

6 Claims, 4 Drawing Figures

TENSION-RELIEVING CABLE DUCT

This invention relates to a tension-relieving cable duct consisting of tough, hard plastic material and comprising a substantially platelike head portion (a head plate) and a hollow shank, which is integrally molded with the head plate, and gripping jaws, which in response to an angular movement of about 90 degrees cooperate with a non-circular through opening, which is formed in a wall of an appliance and contains the duct.

U.S. Pat. No. 3,236,545, especially FIGS. 15, 16, 17 discloses a sleeve, which serves to grip wiring conduit and comprises gripping fingers, which are defined by U-shaped slots in the shank and cooperate with the edges of a non-circular opening in a wall of an appliance in response to a rotation of the gripping sleeve so that its gripping fingers are forced radially inwardly against a tube which is to be gripped and has previously been introduced into the gripping sleeve.

Because the width of the U-shaped parting slot is approximately as large as the thickness of the wall of the appliance, the edge of the through opening may enter that portion of the U-shaped slot which extends radially along the head of the gripping sleeve as the latter is rotated so that the gripping finger then will not be forced inwardly in order to grip the cable.

In accordance with German Patent Application No. 2,556,878 that disadvantage is avoided by a two-part assembly comprising a gripping element, which has radially movable fingers and is inserted into an outer sleeve, the outside peripheral surface of which cooperates with a through opening containing the sleeve, whereas the sleeve is provided on the inside with substantially oval surfaces by which the gripping fingers are forced radially inwardly against the cable extending through the sleeve in response to a rotation of the gripping element. In that assembly, two parts are required so that the dimensions are much larger and the through opening must be much larger too. Besides, the two parts must be compressed from opposite directions so that the assembling work is rather difficult.

It is an object of the invention to provide a one-piece cable duct or cable sleeve which is of the kind described first hereinbefore and in which even with housings having small wall thicknesses the edge of the through opening cannot enter a portion of the U-shaped parting slot associated with a gripping finger but during a rotation will always act against the gripping jaws.

How that object can be accomplished is stated in claim 1, especially its characterizing part. Further improvements are recited in the dependent claims.

The cable duct according to the invention preferably comprises two diametrically opposite, movable gripping jaws, one side of which is disposed near the cable duct and which carry outwardly extending cams, which on their outside surfaces are provided with radially extending edges, which have in cross section the shape of a sawtooth having a ramp which rises toward the head plate, and when the cable duct is inserted into a non-circular through opening of a wall of an appliance the fixing edges depress the gripping jaws and cause them to snap in behind the wall of the duct.

The hollow shank is provided on its outside with preferably two wedge-shaped retaining elements, which serve to retain the cable duct in position of rest when the cable duct has been inserted into the through opening and the cable has been removed whereas during the insertion of the cable duct said retaining elements yield inwardly under the action of the edge of the through opening and snap outwardly to a locking position behind the wall formed with the through opening.

To ensure that the cable duct can be closed by a right-hand rotation and opened by a left-hand rotation, the rotation of the cable duct in the non-circular through opening is restricted to an angle of 60 to 90 degrees. This is accomplished in that the wall formed with the through opening has at least one auxiliary hole, which is covered by the head plate of the cable duct, and two resilient detent noses extending toward each other and spaced 60 to 90 degrees apart protrude from the underside of the head plate and can be resiliently forced into the head plate. One of these detent noses locks against a left-hand rotation and during the insertion of the cable duct into the through opening enters the auxiliary hole. During a right-hand rotation the ramp of the auxiliary hole forces said detent nose into the head plate. The other detent nose snaps into the auxiliary hole to a locking position as a result of said right-hand rotation and during a subsequent left-hand rotation is forced by the ramp of the auxiliary hole into the head plate so that the cable duct is opened and the tension relief is eliminated and the other detent nose snaps again into the auxiliary hole.

Figure 2:
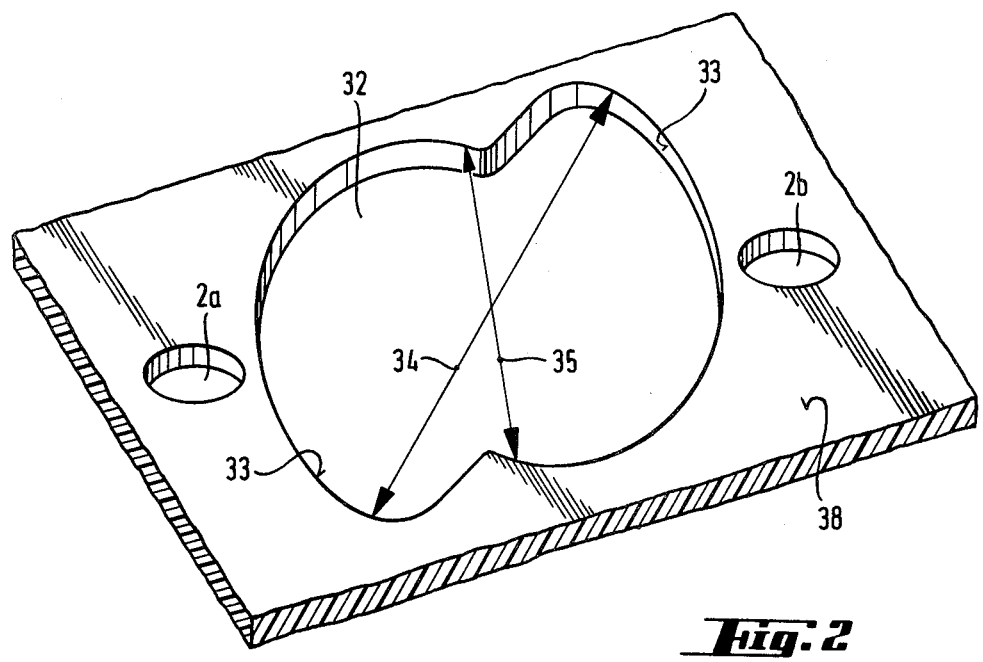
Figure 3:
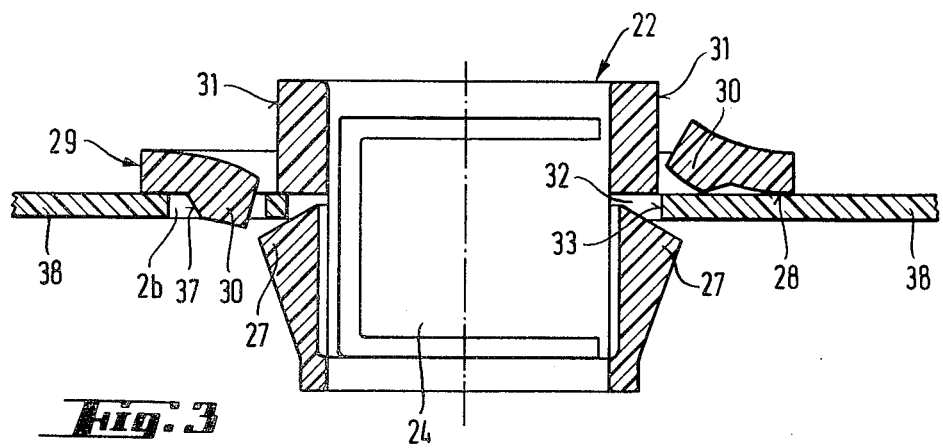
Figure 4:
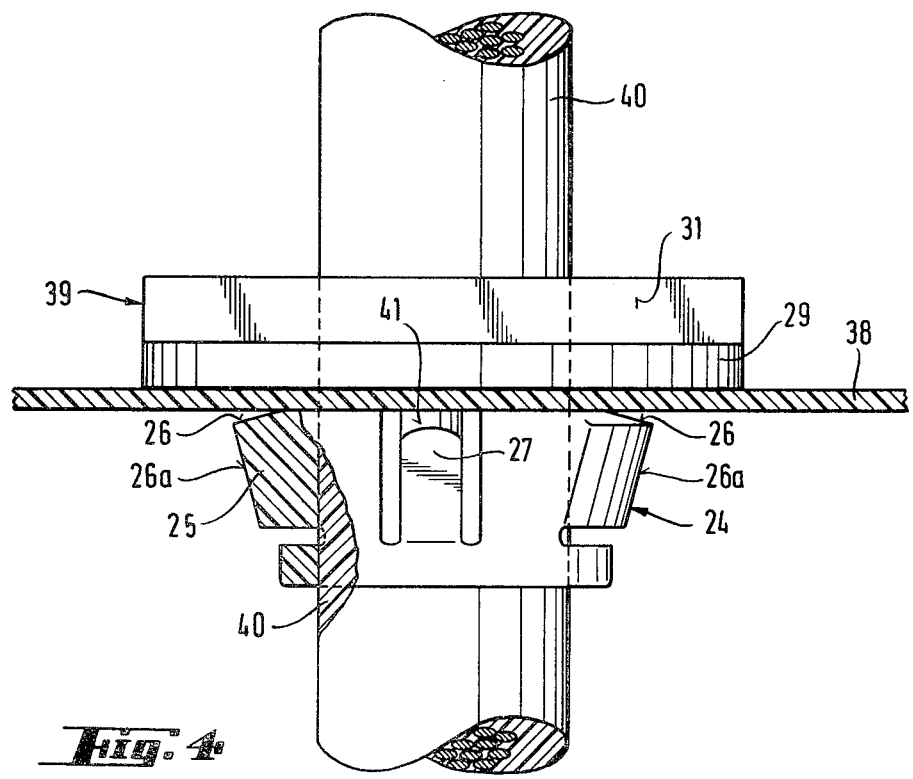

A preferred embodiment of the invention will now be described with reference to the drawings, in which FIG. 1 is a perspective view showing the cable duct according to the invention, FIG. 2 shows a non-circular through hole in a wall of an appliance, FIG. 3 is a sectional view showing a cable duct inserted in a through hole of a wall of an appliance, and FIG. 4 is a side elevation showing a cable duct which has been inserted in a through hole of a wall of an appliance and contains a gripped cable.

The cable duct according to the invention is preferably made of tough, hard plastic material and in accordance with FIG. 1 comprises a hollow shank 22, which extends through and is integral with the head plate 23.

Preferably two resiliently movable gripping jaws 24 are so arranged that one part of their axial length extends into the head plate 23 and the other part extends into the hollow shank 22 and carry outwardly directed wedge-shaped cams 25. A radially extending mounting edge 26 is provided on the outside surface of each of said cams and is sawtooth-shaped in cross-section. Two diametrically opposite, wedge-shaped retaining elements 27 are provided on the hollow shank on the same level; only one of said elements is visible here. Two oppositely directed, resilient detent noses 30 spaced 60 to 90 degrees apart are provided on the underside 28 of the wall-contacting portions 29 and serve to limit the angular movement performed to relieve the cable from tension. Each detent nose 30 is defined by a U-shaped parting slot formed in the associated wall-contacting portion. The detent noses 30 cooperate with preferably two auxiliary holes, which are formed in the wall of the appliance beside the duct-receiving through opening.

These detent cams may have shapes other than that which is shown and may simply consist of wedge-shaped noses, which are directed toward each other and provided under the wall-contacting portions. These noses may be so thin as to be resilient in themselves.

The angular movement may alternatively be limited by ribs and teeth which are disposed in recesses on the underside of the wall-contacting portions and cooperate with protruding surface portions of the duct-receiving through opening in the wall of the appliance. Said protruding surface portions extend into said recesses and engage the ends of said recesses and snap into a locking position behind the ribs or teeth.

FIG. 2 shows a duct-receiving non-circular through opening 32 in the wall of the appliance. That opening may be oval, if desired, and has inwardly facing edges 33, which cooperate with the gripping jaws 24 in such a manner that when the cable duct has been inserted into the opening 32 and is rotated through 60 to 90 degrees the gripping jaws 24 will be forced inwardly to grip a cable which has previously been introduced and to relieve said cable from tension.

The extent of the clamping movement depends on the difference between the largest diameter 34 and the smallest diameter 35 of the non-circular through opening and on the height of the cams 25, which are carried by the gripping jaws 24 and must match that difference. FIGS. 2a and 2b show two auxiliary holes, which are associated in FIG. 2 and cooperate with the detent noses 30, which are spaced 60 to 90 degrees apart and are provided under the wall-contacting portions 29 of the cable duct. The ramps 37 of said auxiliary holes face away from each other to effect a gripping action for a tension relief in response to a rotation in one sense, e.g., a right-hand rotation, and to effect a release in response to a rotation in the other sense, e.g., a left-hand rotation.

The head plate of the duct is U-shaped or hat-shaped in cross-section adjacent to the gripping surfaces and in use the wall-contacting portions of the head plate engage the wall of the appliance.

The head plate has surfaces 31 which are engageable by a wrench. The head may have any of various shapes and its shape will be selected in dependence on the means which are used to rotate the head.

FIG. 3 is an axial sectional view showing a cable duct which has snapped into the non-circular opening 32 of a wall 38 and one detent nose 30 of which has snapped into the auxiliary hole IIb whereas the second detent nose 30 bears under pressure against the wall-contacting portion. The wedge-shaped retaining elements 27 extend behind the wall of the appliance and retain the cable duct in said wall. The gripping jaw 24 is joined on one side to the hollow shank 22 and is separated from the hat-shaped portion 39 of the head plate and from the shank 22 by parting slots. The gripping jaw can be arranged in a position which is spaced 90 degrees from the position shown, i.e., the gripping jaw may extend parallel to the axis of the cable duct.

FIG. 4 is a side elevation showing a cable duct according to invention which has been inserted into a wall 38 and contains a cable 40, which is gripped for tension relief. The wedge-shaped retaining element has a radially curved retaining surface 41. The gripping jaws 24 are provided on the outside surface with retaining ribs 26 or fixing edges, which extend behind the wall 38. In this elevation the surface 31 which is engageable by a wrench is seen above the bearing surface.

I claim:

1. A tension-relieving cable duct comprising a head part and a hollow shank integral with the head part, said head part being U-shaped in cross-section and forming a wall engaging portion and a portion offset from said wall engaging portion to define a recess, and at least one resiliently movable gripping jaw on said duct having a part of its axial length extending into said recess of said head part and another part of its axial length extending into the hollow shank, said gripping jaw being provided on an outside portion thereof with at least one sawtooth-shaped edge which has a ramp rising toward the head part, whereby upon insertion of said duct containing a cable into a non-circular through opening in a wall and angular movement of said duct, said gripping jaw will be moved to grip the cable.

2. A cable duct according to claim 1, characterized by at least one wedge-shaped retaining element, which is provided on the hollow shank on the same level as the edge and has a retaining surface, which is curved in the peripheral direction.

3. A tension-relieving cable duct according to claim 1, wherein said offset portion of said head part has at least a pair of laterally disposed surfaces which are engageable by a wrench.

4. A tension-relieving cable duct according to any one of claims 1, 2 or 3, wherein said wall engaging portion of said head part is provided with resilient detent noses spaced 60 to 90 degrees apart and defined by U-shaped slots, said detent noses facing each other and cooperating with holes in the wall having ramps which face away from each other.

5. A tension-relieving cable duct according to any one of claims 1, 2 or 3, wherein said wall engaging portion of said head part is resilient and on the underside comprises two detent projections spaced 90 degrees apart for cooperation with holes in the wall.

6. A tension-relieving cable duct according to any one of claims 1, 2 or 3, wherein said wall engaging portion of said head part has profiled detent elements cooperable with apertures provided on the wall adjacent said non-circular through opening.

* * * * *